Jan. 19, 1926.  1,570,374
P. H. CRAWFORD ET AL
FILTERING APPARATUS
Filed March 31, 1921  5 Sheets-Sheet 1

WITNESS
A. E. Alberg.

INVENTOR
P. H. Crawford and
J. F. Abbema
BY
White Prost & Evans
their ATTORNEYS

Jan. 19, 1926.　　　　　　　　　　　　　　　　　　　1,570,374
P. H. CRAWFORD ET AL
FILTERING APPARATUS
Filed March 31, 1921　　　5 Sheets-Sheet 4
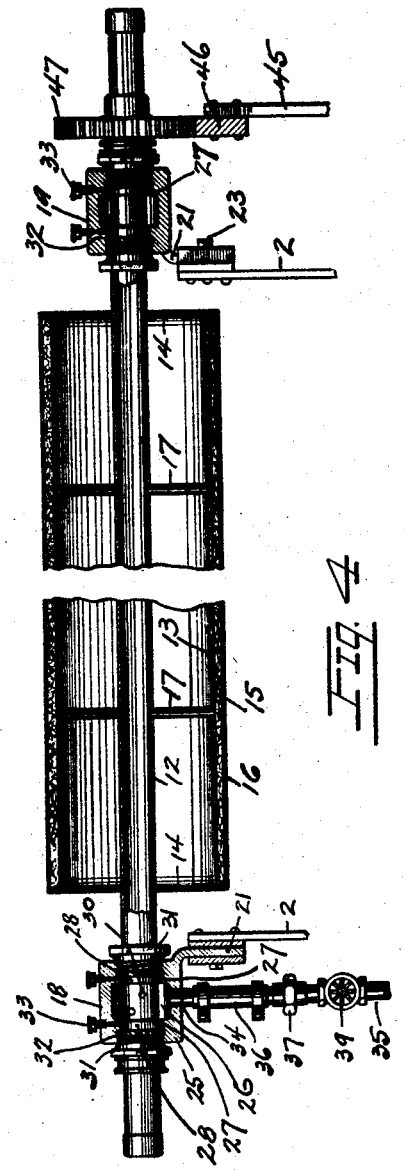
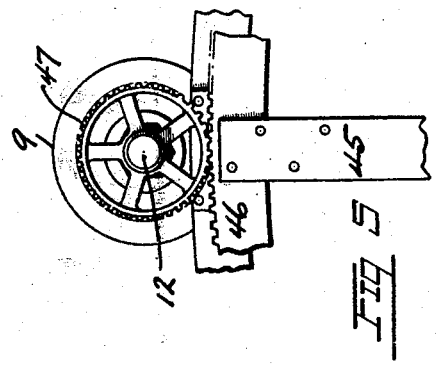
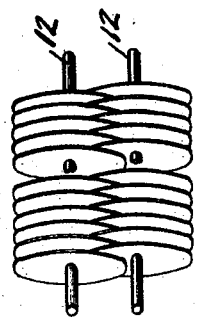
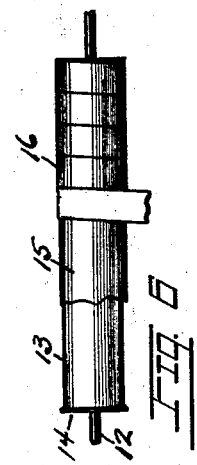
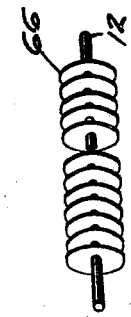
WITNESS
INVENTOR
P. H. CRAWFORD AND
J. F. ABBETH
BY
ATTORNEYS Jan. 19, 1926. 1,570,374
P. H. CRAWFORD ET AL
FILTERING APPARATUS
Filed March 31, 1921 5 Sheets-Sheet 5
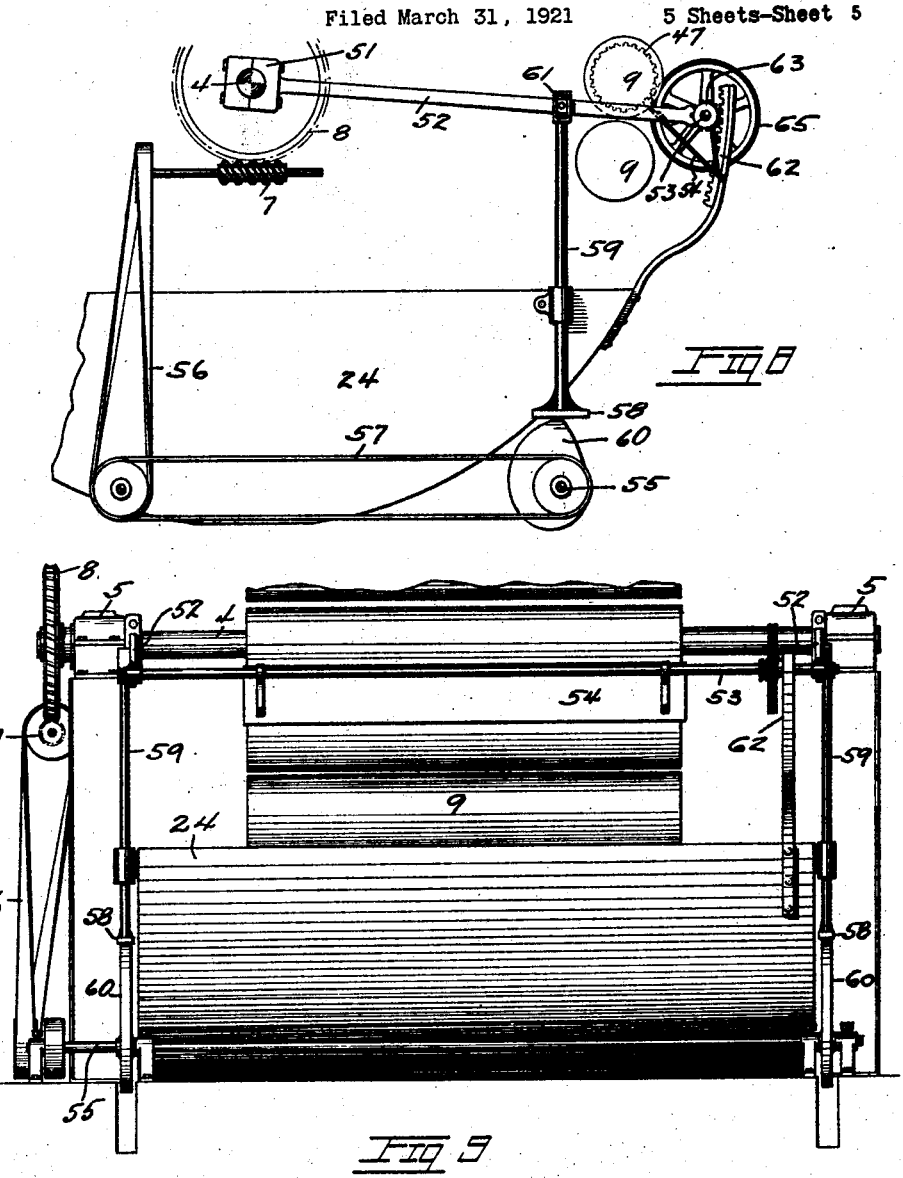
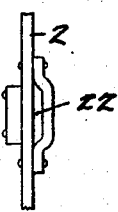
WITNESS
INVENTOR
P.H. CRAWFORD AND
J.F. ABBERN
BY
their ATTORNEYS Patented Jan. 19, 1926.

1,570,374

UNITED STATES PATENT OFFICE.

PAUL H. CRAWFORD, OF PALO ALTO, AND JOHN F. ABBEMA, OF OAKLAND, CALIFORNIA.

FILTERING APPARATUS.

Application filed March 31, 1921. Serial No. 457,249.

*To all whom it may concern:*

Be it known that we, PAUL H. CRAWFORD, a citizen of the United States, and a resident of Palo Alto, Santa Clara County, State of California, and JOHN F. ABBEMA, a subject of Holland, and a resident of Oakland, county of Alameda, and State of California, have invented a certain new and useful Filtering Apparatus, of which the following is a specification.

The invention relates to an apparatus for filtering or separating solids and semi-solids from liquids or fluids containing the same.

The filter of our invention is capable of use in processes where it is desirable to separate liquids or fluids from a mixture containing the same and solid or semi-solid material and is particularly applicable to metallurgical, chemical, sugar manufacturing and other processes, in which the unfilterable material builds up as a cake on the filtering medium due to the passage of the filtrate through the filtering medium.

An object of the invention is to provide a filter having a very large filtering area in proportion to the ground space occupied by the filter.

Another object of the invention is to provide a filtering apparatus comprising a plurality of filter units which may be readily removed singly from the apparatus, for replacement or repair without interfering with the filtering operation.

A further object of the invention is to provide a filtering apparatus in which the solution remaining in the cake of unfilterable material may be substantially entirely replaced by water or other liquid prior to the removal of the cake from the filter unit.

A further object of the invention is to provide means for effectively removing the cakes from the filter units without interfering with the operation of the filter.

The invention possesses other advantageous features, some of which, with the foregoing, will be set forth at length in the following description where we shall outline in full, that form of the invention which we have selected for illustration in the drawings accompanying and forming part of the present specification. In said drawings, we have shown one specific embodiment of our generic invention, but it is to be understood that we do not limit ourselves to such form, since the invention, as set forth in the claims, may be embodied in a plurality of forms.

The filtering apparatus of our invention comprises, generally, a rotating frame, the lower portion of which is disposed in the pulp boot or trough containing the mixture of liquid and solid or semi-solid material. Mounted on the frame are a plurality of filter units arranged in close relation, and upon rotation of the frame these units are moved through and submerged in the pulp, then pass from the pulp for dewatering or solution replacement and then subjected to the operation of mechanism for removing the cake of unfilterable material from the units. The units are preferably rotatably mounted on the frame and rotate during the rotation of the frame, so that the processes of filtering, dewatering or replacement and removal of the cake are facilitated. The filter unit may be constructed in a plurality of forms and in the accompanying drawings, we have shown several types of forms which may be advantageously employed. By providing a plurality of filter units arranged in close relation, a very large filtering area is provided in proportion to the ground space occupied by the apparatus so that one filter of this type may supplant a plurality of filters of the drum type. The drum type filter is now widely used and comprises a drum or cylinder having a peripheral filtering surface and arranged to rotate in a pulp boot, in which a portion of the filtering surface is submerged in the contained pulp.

Referring to the accompanying drawings:

Fig. 4 is a longitudinal section through a filter unit in its mounting.

Fig. 5 is an end view of the filter unit and its rotary mechanism.

Fig. 6 is an elevation of a filter unit partially assembled.

Fig. 7 is a detail of the filter unit carrying frame,

Fig. 8 is an end elevation of the scraper and its operating mechanism, several filter units being shown in position.

Fig. 9 is a side elevation of the scraper and its operating mechanism, several filter units being shown in position.

Fig. 10 is a perspective view of a modified form of filter unit.

Fig. 11 is a perspective view showing an arrangement of adjacent filter units of the type shown in Fig. 10.

Figure 1:
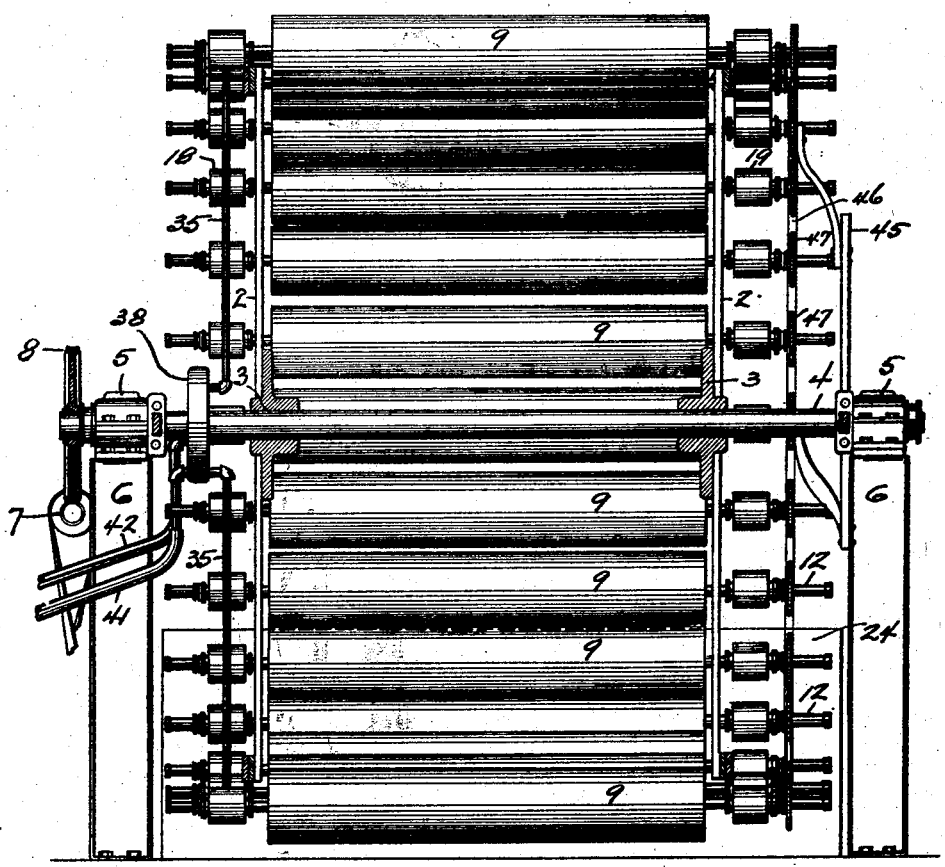
Figure 1 is a vertical longitudinal section of the filtering apparatus of our invention.
Figure 2:
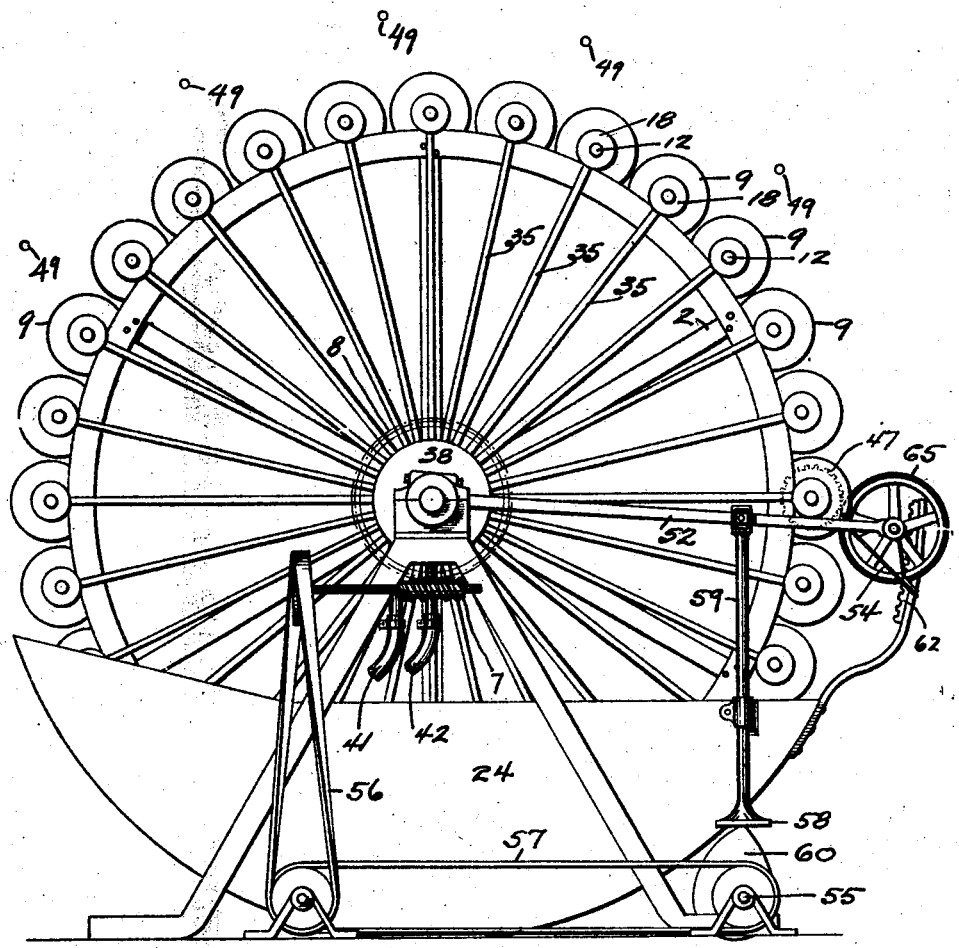
Fig. 2 is an elevation of one end of the apparatus.

The filtering apparatus shown in the accompanying drawings comprises a rotatable frame comprising the spiders or end frames 2, secured to the hubs 3 which are secured to the shaft 4, rotatable in bearings 5 mounted on the pedestals 6. The shaft 4 is slowly rotated in any suitable manner, such as by the power driven worm 7 engaging the worm wheel 8 on the shaft. Mounted on the rotatable frame are a plurality of longitudinally disposed filter units 9, arranged in close relation and preferably rotatable on their axes. In the filter shown in Fig. 1, the filter units are cylindrical in shape and are disposed peripherally on the frame and are arranged in close relation, the spacing between the surfaces being sufficient to permit the formation of cakes of the desired thickness thereon without interfering with the rotation of the filter units.

The filter unit shown in Fig. 4 comprises a cylindrical metallic shell mounted on, secured to and forming a tight joint with an axially disposed metallic conduit or pipe 12. The side 13 of the shell is depressed within the periphery of the end plates 14, forming a shallow recess, in which cocoa matting 15 or other comparable material is disposed. The cocoa matting is held in place by a sheathing 16 of canvas or other filtering medium, which is preferably wrapped spirally around the cocoa matting, as shown in Fig. 6. The liquid passing through the canvas passes through the cocoa matting filling to radially disposed pipes 17 connected to the pipe 12 and opening on the side of the cylinder and into the pipe 12. It is understood that a condition of vacuum or reduction of pressure is produced in the pipe 12, which condition is transferred to the filtering medium, causing the passage of liquid through the filtering medium. The pipe 12 extends from both ends of the filtering unit cylinder, and is provided on both ends, substantially midway of the extended portions, with bearing heads 18—19, in which the pipe is journaled. Each bearing head is provided with a tongue 21 which is disposed in a peripheral radial slot 22 in the rotatable frame or carrier, the tongue being locked in the slot by a screw 23 passing through a portion of the frame and the tongue. By virtue of this mounting, a filter unit may be readily removed from the carrier, by loosening or removing the screw 23 and then moving the unit radially from the carrier. The extending ends of the pipe 12 serve as handles for lifting and handling the filter unit.

Arranged between the pedestals 6, is a pulp boot or trough 24 which contains the mixture of liquid and solids or semi-solids to be filtered, and as the carrier rotates, the filter units are carried into the boot and are submerged in the pulp or mixture therein. The bearing heads 18 and 19 are constructed to prevent the entry of solid and semi-solid material to the bearing. The bearing head 18, comprises a hollow bearing block 25 provided with an interior chamber 26 of greater diameter than the pipe 12, which pipe is provided with perforations 30 at that portion lying within the chamber to permit the passage of liquid or fluid from the pipe. The ends of the chamber are defined by annular bearing webs 27 which are machined on their inner surfaces to coact with the rings 28 of Babbitt or other bearing metal secured to the pipe 12. The block is provided on both ends with packing glands 31 pressing the packing rings 32 into engagement with the pipe and holding the pipe against longitudinal movement. Grease cups 33 are also provided for lubricating the bearings. The bearing block 19 is similar to the block 18 with the exception that the pipe 12 is imperforate.

The bearing block 18 is provided with means for conveying the filtrate therefrom. Each bearing block 18 is provided with a nipple 34 which is connected to a filtrate discharge pipe 35 by a short length of hose 36 and a union 37. The various pipes 35, there being one for each unit, lead into a vacuum head 38 surrounding the main shaft 4 and each unit pipe 35 is provided with a valve 39 for cutting off communication with the unit. When it is desired to remove a filter unit, the valve 39 is closed, the union 37 unscrewed, to break the physical connection and the holding screws 23 released. The removal of one unit will, therefore, not interfere in any manner with the operation of the remaining units. The vacuum head is provided with ports for directing the filtrate through the discharge pipe 41 and the washing solution through the discharge pipe 42, so that the two liquids may be separately handled. Vacuum heads are well known in the art and require no description herein.

As the filter units pass through the boot, the filtrate passes through the submerged filtering mediums, forming a cake thereon, which as it emerges from the boot carries in it a considerable amount of solution and, since the solution is usually the valuable constituent of the mixture, the cake is subjected to washing to replace the solution with water and to the action of the vacuum, to dewater the cake as much as is possible. To wash the cake efficiently, it is desirable to rotate the filter units, so that all parts of the cake will be subjected to the washing sprays and means are, therefore, provided for rotating the units about their axes. Secured to one of the pedestals 6 or to some other convenient stationary structure, is a frame 45 carrying an arcuate rack 46 concentric with the main shaft 4 and extending through an arc of about 180° above the horizontal plane passing through the axis of the main shaft. Secured to each pipe 12 is a gear 47 which is arranged to engage the rack and cause rotation of the filter unit as the unit carrier is rotated. Arranged adjacent the take-on end of the rack is a spray nozzle 48 for discharging a jet of water against the gears to wash solid and semisolid material therefrom, which might produce a deleterious action on the rack or gear. Spaced apart over the top of the apparatus are a plurality of spray pipes 49 from which sprays of wash water or wash solution are discharged onto the revolving cake-covered units, for the purpose of replacing the valuable solution therein. These spray pipes are preferably spaced apart circumferentially so that the cakes may be subjected to efficient washing action.

Means are provided for removing the cakes from the filter units just prior to the entry of the unit into the pulp boot. Any suitable cake removing mechanism may be employed, and in the accompanying drawings we have shown one form of efficient mechanism. The mechanism comprises broadly a scraper which is moved in an arc concentric with the axis of the shaft 4 and means for rotating the unit while the scraper is in contact therewith. Journaled on the shaft 4, at opposite ends thereof, by the cross heads 51 are the levers 52, to which, at their outer ends, is secured a non-rotatable shaft or bar 53, to which the inclined scraper plate 54 is attached, the scraping edge of the plate lying substantially in the circle of the outer surfaces of the filter units. The levers 52 are oscillated so that the scraper moves in a slight arc, downwardly in time with the bodily movement of the filter unit, and rapidly upward, by cams 60, secured to the shaft 55 and driven from the main drive shaft by chain drives 56 and 57 and associated sprockets. Bearing on the cams 60 are shoes 58 formed on the rods 59 which are adjustably connected to the levers 52 by the cross heads 61.

Means are provided for rotating the filter unit comparatively rapidly during the time that the scraper is engaged with the filter unit, to insure the removal of all of the cake.

Figure 3:
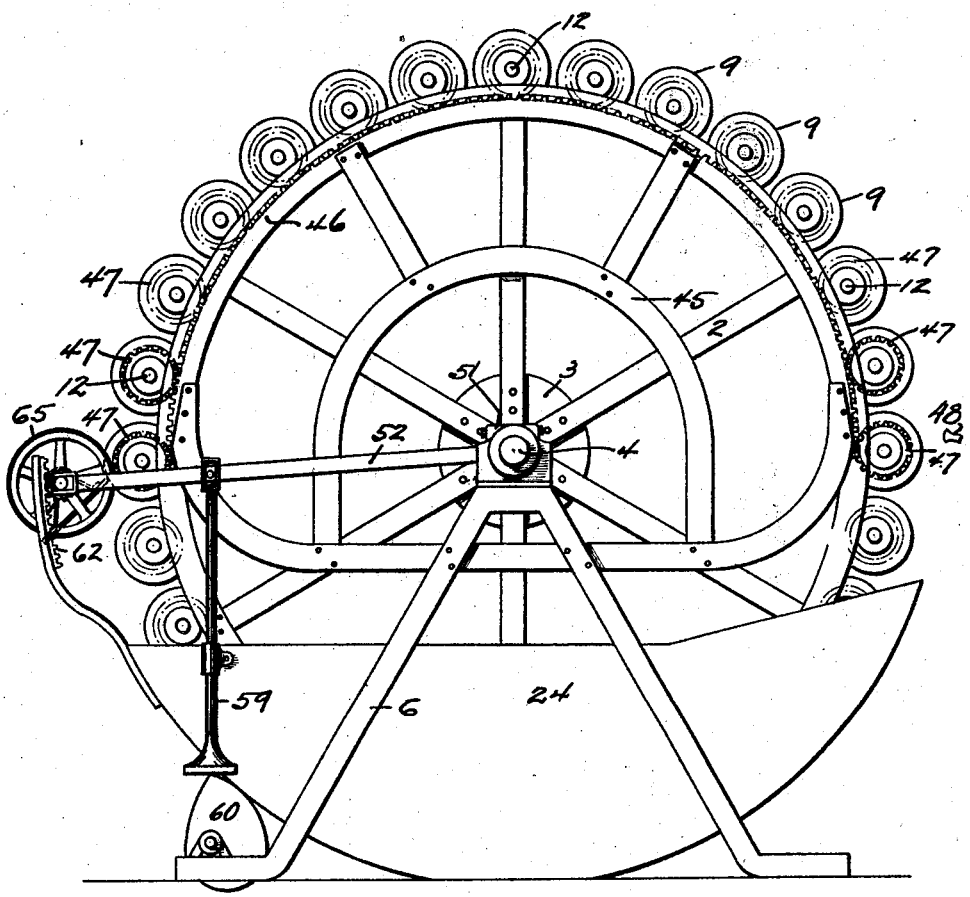
Fig. 3 is an elevation of the opposite end of the apparatus.

Particular attention is directed to Figs. 3 and 9. In Fig. 3 a filter unit 9 provided with a gear 47 is about to disengage the arcuate rack 46 since the unit is being rotated in a counterclockwise direction about the shaft 4. When the teeth of gear 47 disengage rack 46 they are contacted by a friction wheel 65 carried by the lever 52. The filter unit 9 and wheel 65 then move together in contactual relation counterclockwise about the shaft 4, since the position of cam 60 allows the arm 52, supporting the friction wheel, to fall, due to the influence of gravity. At the same time, a gear 63 on the wheel 65 engages a stationary arcuate rack 62 and gives a rapid rotation about its own axis to wheel 65 which in turn imparts its motion to the filter unit. Thus the filter unit is rapidly spun about its own axis just after it disengages the rack 46 and during the time it moves through the angle subtended by the rack 62. The lever 52 which carries the wheel 65 also carries a scraper plate 54 so that as the filter unit is rotated while it is in engagement with wheel 65, the scraper comes into contact with the filter unit and removes the cake therefrom.

Instead of forming the filter unit as a cylinder, it may be formed of a plurality of axially disposed discs 66, as shown in 10; this arrangement producing approximately twice the filtering area as the cylindrical type unit, with the diameter of the discs the same as the diameter of the cylinder. When this arrangement is used, the scraper is made in the form of a comb with the teeth extending between and scraping the sides of the discs. The filtering area may be still further increased by using the construction of filter unit shown in Fig. 11, in which the discs are made larger in diameter; the discs of the successive units being arranged so that they overlap. The filter area produced by this construction is approximately eight times that produced by a cylindrical unit. The filtering capacity of a filtering apparatus of our invention using the cylindrical type filter unit is approximately three times that of a drum filter occupying the same floor space.

When desired, a plurality of superposed scrapers may be employed to insure the removal of the cake from the filter units and this arrangement is essential with the type of filter unit shown in Fig. 11, in which two adjacent units may be considered as forming a compound unit.

We claim:

1. A filtering apparatus, comprising a rotatable carrier, a plurality of independent cylindrical filter units arranged regularly around the circumference of said carrier, said filter units being spaced apart to permit a cake of unfilterable material to build up on the whole cylindrical filtering surface of each unit and a receptacle for the material to be filtered through which the filter units pass as the carrier is rotated.

2. A filtering apparatus, comprising a rotatable carrier, a plurality of independent filtering units journaled on said carrier, means for rotating said units on said carrier and a receptacle for the material to be filtered through which the filter units pass as the carrier is rotated.

3. A filtering apparatus, comprising a rotatable carrier, a plurality of bearings removably secured to said carrier, a plurality of filter units journaled in said bearings and a receptacle for the material to be filtered through which the filter units pass as the carrier is rotated.

4. A filtering apparatus, comprising a rotatable carrier, a plurality of independent cylindrical filter units spaced apart around the circumference of said carrier and a receptacle for the material to be filtered through which the filter units pass as the carrier is rotated.

5. A filtering apparatus, comprising a rotatable carrier, a plurality of independent filter units rotatably mounted on said carrier, means operative by the rotation of the carrier for rotating said filter units on their axes and a receptacle for the material to be filtered through which the filter units pass as the carrier is rotated.

6. A filtering apparatus, comprising a rotatable carrier, a plurality of independent filter units rotatably mounted on said carrier, a gear secured to each filter unit and a stationary rack arranged to be engaged by said gears.

7. A filtering apparatus, comprising a rotatable carrier, a plurality of independent filter units rotatably mounted on said carrier, a gear secured to each filter unit, a receptacle for the material to be filtered through which the filter units pass as the carrier is rotated and a stationary arcuate rack arranged above said receptacle and arranged to be engaged by said gears.

8. A filtering apparatus, comprising a rotatable carrier, a plurality of hollow bearings secured to said carrier, filter units journaled in said bearings and discharging filtrate thereinto, a filtrate head concentric with the axis of said carrier and conduits connecting the bearings with the filtrate head.

9. A filtering apparatus, comprising a rotatable carrier, a plurality of hollow bearing blocks secured to said carrier, filter units journaled in said blocks and discharging filtrate thereinto, means for rotating said filter units on said carrier and means for conveying the filtrate from said bearing blocks.

10. A filtering apparatus, comprising a rotatable carrier, a plurality of independent cylindrical filter units rotatably mounted on said carrier, a receptacle for the material to be filtered through which the filter units pass as the carrier is rotated, and means for removing the cakes of unfilterable material from said filter units.

11. A filtering apparatus, comprising a rotatable carrier, a plurality of filter units rotatably mounted on said carrier, a receptacle for the material to be filtered through which the filtering units pass as the carrier is rotated, means for removing the cakes of unfilterable material from said filter units and means for rotating the filter unit in operative relation with the cake removing means.

12. A filtering apparatus, comprising a rotatable carrier, a plurality of filter units mounted for rotation on said carrier, and means movable in an arc concentric with the axis of the carrier for removing the unfilterable material from the filter units.

13. A filter apparatus, comprising a rotatable carrier, a plurality of filter units mounted for rotation on said carrier, and a movable scraper for removing the unfilterable material from said filter units.

14. A filter apparatus, comprising a rotatable carrier, a plurality of filter units mounted for rotation on said carrier, a movable scraper for removing the unfilterable material from said filter units and means for rotating the filter unit in operative relation with said scraper.

15. A filter apparatus, comprising a rotatable carrier, a plurality of filter units mounted for rotation on said carrier, a scraper movable in time with the bodily movement of the filter unit and means for rotating the filter unit in operative relation with the scraper.

16. A filter apparatus, comprising a rotatable carrier, a plurality of filter units mounted for rotation on said carrier, a scraper movable in time with the bodily movement of the filter unit and means operative by the movement of the scraper for rotating the associated filter unit.

17. A filter apparatus, comprising a rotatable carrier, a plurality of filter units mounted for rotation on said carrier, a scraper movable in time with the carrier, and means for rotating the filter unit cooperating with the scraper.

18. A filtering apparatus comprising a rotatable carrier, a plurality of filter units rotatably mounted on said carrier, a receptacle for the material to be filtered through which the filter units pass as the carrier is rotated, means for directing sprays of washing liquid against said units as they are carried around by said carrier and means for rotating said units on said carrier.

In testimony whereof, we have hereunto set our hands.

PAUL H. CRAWFORD.
JOHN F. ABBEMA.